US010879781B2

(12) United States Patent
Zhu et al.

(10) Patent No.: US 10,879,781 B2
(45) Date of Patent: *Dec. 29, 2020

(54) LINEAR VIBRATING MOTOR

(71) Applicant: GOERTEK INC., Weifang (CN)

(72) Inventors: Yueguang Zhu, Weifang (CN); Yuncheng Li, Weifang (CN)

(73) Assignee: GOERTEK INC., Weifang (CN)

( * ) Notice: Subject to any disclaimer, the term of this patent is extended or adjusted under 35 U.S.C. 154(b) by 61 days.

This patent is subject to a terminal disclaimer.

(21) Appl. No.: 16/083,608

(22) PCT Filed: Jun. 1, 2016

(86) PCT No.: PCT/CN2016/084292
§ 371 (c)(1),
(2) Date: Sep. 10, 2018

(87) PCT Pub. No.: WO2017/152515
PCT Pub. Date: Sep. 14, 2017

(65) Prior Publication Data
US 2019/0081543 A1 Mar. 14, 2019

(30) Foreign Application Priority Data
Mar. 11, 2016 (CN) .......................... 2016 1 0140461

(51) Int. Cl.
*H02K 33/02* (2006.01)
*H02K 33/16* (2006.01)

(52) U.S. Cl.
CPC ............. *H02K 33/02* (2013.01); *H02K 33/16* (2013.01)

(58) Field of Classification Search
CPC ........ H02K 33/00; H02K 33/02; H02K 33/06; H02K 33/16; H02K 33/04; H02K 33/08; H02K 33/10; B06B 1/04; B06B 1/1045
See application file for complete search history.

(56) References Cited

U.S. PATENT DOCUMENTS

| 2010/0231060 A1* | 9/2010 | Bang ...................... H02K 5/225 310/25 |
| 2011/0062803 A1* | 3/2011 | Lee ......................... H02K 33/18 310/29 |

(Continued)

FOREIGN PATENT DOCUMENTS

| CN | 101964578 A | 2/2011 |
| CN | 102035338 A | 4/2011 |

(Continued)

OTHER PUBLICATIONS

Park, Machine Translation of KR20120092248, Aug. 2012 (Year: 2012).*

*Primary Examiner* — Quyen P Leung
*Assistant Examiner* — Eric Johnson
(74) *Attorney, Agent, or Firm* — Saliwanchik, Lloyd & Eisenschenk

(57) ABSTRACT

The present application relates to the technical field of electronics and provides a linear vibrating motor comprising a motor housing, a stator, a vibrator and an elastic support member for suspending the vibrator in the motor housing and for supporting the vibrator and providing an elastic restoring force; the motor housing comprises a first lateral housing and a second lateral housing; the first lateral housing comprises a first lateral plate, as well as a second lateral plate and a third lateral plate that are disposed at two ends of the first lateral plate respectively; the second lateral housing comprises a fourth lateral plate, as well as a fifth lateral plate and a sixth lateral plate that are disposed at two ends of the fourth lateral plate respectively; and the first lateral housing and the second lateral housing are fastened to form a closed space that accommodates the stator.

8 Claims, 2 Drawing Sheets

(56) References Cited

U.S. PATENT DOCUMENTS

| | | | | |
|---|---|---|---|---|
| 2011/0062804 A1* | 3/2011 | Lee | ................ | H02K 33/18 |
| | | | | 310/30 |
| 2011/0068639 A1* | 3/2011 | Choi | ................ | H02K 33/16 |
| | | | | 310/25 |
| 2011/0068641 A1* | 3/2011 | Choi | ................ | H02K 33/16 |
| | | | | 310/25 |
| 2011/0101798 A1* | 5/2011 | Lee | ................ | H02K 33/16 |
| | | | | 310/29 |
| 2012/0104875 A1 | 5/2012 | Park | | |
| 2012/0169148 A1* | 7/2012 | Kim | ................ | H02K 33/16 |
| | | | | 310/25 |
| 2014/0202252 A1* | 7/2014 | Umehara | ............ | H02K 33/16 |
| | | | | 73/664 |

FOREIGN PATENT DOCUMENTS

| | | | |
|---|---|---|---|
| CN | 202135034 U | 2/2012 | |
| CN | 102780302 A | 11/2012 | |
| CN | 103401395 A | 11/2013 | |
| CN | 204947873 U | 1/2016 | |
| CN | 204993010 U | 1/2016 | |
| CN | 105591512 A | 5/2016 | |
| CN | 205595985 U | 9/2016 | |
| EP | 2608373 A1 | 6/2013 | |
| KR | 20120092248 A | * | 8/2012 |

\* cited by examiner

LINEAR VIBRATING MOTOR

CROSS REFERENCE TO RELATED APPLICATIONS

This application is a National Stage of International Application No. PCT/CN2016/084292, filed on Jun. 1, 2016, which claims priority to Chinese Patent Application No. 201610140461.8, filed on Mar. 11, 2016, both of which are hereby incorporated by reference in their entireties.

FIELD OF THE INVENTION

The present application belongs to the technical field of electronics, and in particular relates to a linear vibrating motor.

BACKGROUND OF THE INVENTION

With rapid development of portable consumer electronics at present, more and more consumers favor the electronics that are thinner and have better tactile experience. A linear vibrating motor is generally used as an actuator for the tactile experience and may play a system vibration feedback role. The development direction of thinning of the electronics determines that an elastic support member has to be improved by flattening.

Most linear vibrating motors mainly comprise a motor housing, a vibrator and a stator. The vibrator comprises the elastic support member. The linear vibrating motor realize overall vibration mainly through the elastic support member which is commonly in the format of a spring or an elastic sheet. The elastic support member in the format of the spring or the elastic sheet is mainly designed based on the internal space of the linear vibrating motor. The motor housing that is generally of a stretching structure is relatively more complicated in forming process and relatively higher in processing difficulty and cost.

SUMMARY OF THE INVENTION

An objective of the present application is to provide a linear vibrating motor to solve the problems in the prior art that a motor housing which generally adopts a stretching structure is relatively more complicated in forming process and relatively higher in processing difficulty and cost.

The present application is realized as follows. The linear vibrating motor comprises a motor housing, a stator, a vibrator and an elastic support member through which the vibrator is suspended in the motor housing. The elastic support member is configured to support the vibrator and to provide an elastic restoring force. The motor housing comprises a first lateral housing and a second lateral housing. The first lateral housing comprises a first lateral plate, as well as a second lateral plate and a third lateral plate that are disposed at two ends of the first lateral plate respectively. The second lateral housing comprises a fourth lateral plate, as well as a fifth lateral plate and a sixth lateral plate that are disposed at two ends of the fourth lateral plate respectively. The first lateral housing and the second lateral housing are fastened to form a closed space that accommodates the stator, the vibrator and the elastic support member.

As an improved solution, the first lateral plate and the fourth lateral plate are parallel to each other and are in parallel with a vibrating direction of the vibrator.

As an improved solution, the second lateral plate and the third lateral plate are parallel to each other. The fifth lateral plate and the sixth lateral plate are parallel to each other.

As an improved solution, the first lateral plate is docked with and perpendicular to the fifth lateral plate and the sixth lateral plate. The second lateral plate is docked with and perpendicular to the fourth lateral plate, the fifth lateral plate and the sixth lateral plate. The third lateral plate is docked with and perpendicular to the fourth lateral plate, the fifth lateral plate and the sixth lateral plate.

As an improved solution, a bonding pad is disposed on the second lateral housing.

As an improved solution, the stator comprises a coil and a circuit board that are connected to each other. The circuit board is secured to the motor housing.

As an improved solution, the circuit board is of a U-shaped structure of which a bottom lateral plate is fixedly connected to the fourth lateral plate and two parallel lateral plates are in parallel with the fifth lateral plate and the second lateral plate.

As an improved solution, the two elastic support members are located at two ends of the vibrator along the vibration direction of the vibrator respectively.

As an improved solution, the vibrator comprises a mass block and a magnet. A mounting hole configured to mount the magnet is provided in the mass block.

As an improved solution, a limiting block is further disposed in the motor housing.

The linear vibrating motor comprises the motor housing, the stator, the vibrator and the elastic support member through which the vibrator is suspended in the motor housing. The elastic support member is configured to support the vibrator and to provide the elastic restoring force. The motor housing comprises the first lateral housing and the second lateral housing. The first lateral housing comprises the first lateral plate, as well as the second lateral plate and the third lateral plate that are disposed at two ends of the first lateral plate respectively. The second lateral housing comprises the fourth lateral plate, as well as the fifth lateral plate and the sixth lateral plate that are disposed at two ends of the fourth lateral plate respectively. The first lateral housing and the second lateral housing are fastened to form the closed space that accommodates the stator, the vibrator and the elastic support member. Thus, vibration feedback of a touch operation by a user may be realized. Disposing of the first lateral housing and the second lateral housing makes the motor housing simple in forming process, relatively lower in processing difficulty and effectively reduced in cost.

1—elastic support member; 2—first lateral housing; 3—second lateral housing; 4—first lateral plate; 5—second lateral plate; 6—third lateral plate; 7—fourth lateral plate; 8—fifth lateral plate; 9—sixth lateral plate; 10—coil; 11—circuit board; 12—bottom lateral plate; 13—parallel lateral plate; 14—mass block; 15—magnet; 16—washer plate; 17—limiting block; 18—stopper.

DETAILED DESCRIPTION OF THE EMBODIMENTS

In order to make the objectives, technical solutions, and advantages of the present application clearer, the followings further describe the present application in detail with reference to the accompanying drawings and the embodiments. It should be understood that the specific embodiments described herein are merely used to explain but not to limit the present application.

Figure 1:
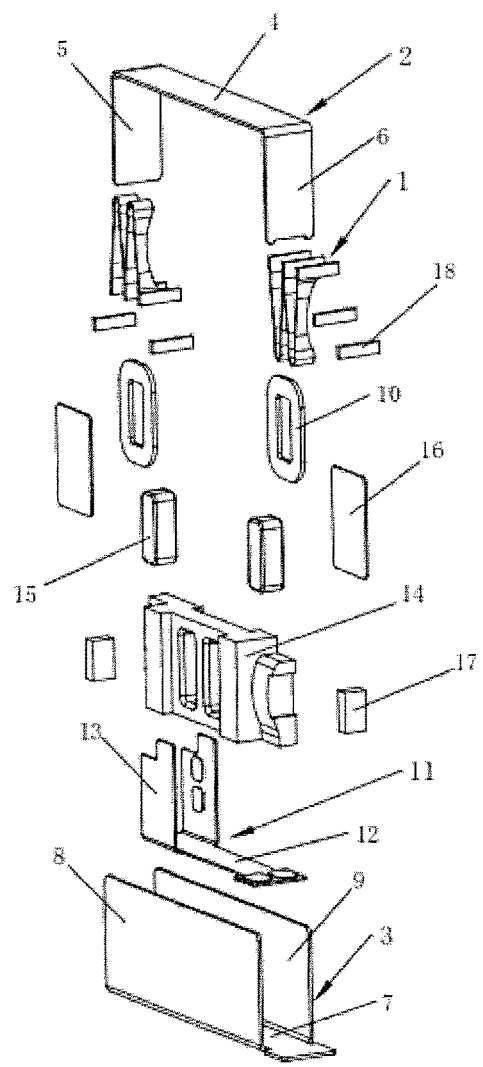
FIG. 1 is a schematic exploded view of a linear vibrating motor provided by the present application.

FIG. 1 is an exploded view of a linear vibrating motor provided by the present application and only shows portions related to the present application to facilitate explanation.

Figure 2:
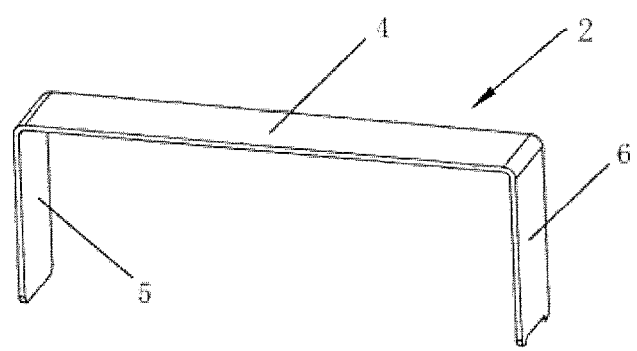
FIG. 2 is a schematic structural view of a first lateral housing provided by the present application.
Figure 3:
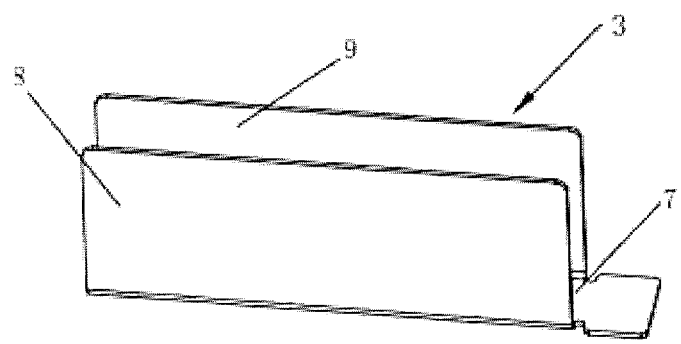
FIG. 3 is a schematic structural view of a second lateral housing provided by the present application.

With reference to FIG. 2 and FIG. 3, the linear vibrating motor comprises a motor housing, a stator, a vibrator and elastic support members 1 through which the vibrator is suspended in the motor housing. Two elastic support members 1 are configured to support the vibrator and to provide elastic restoring forces and are located at two ends of a vibrating direction of the vibrator respectively.

The motor housing comprises a first lateral housing 2 and a second lateral housing 3. The first lateral housing 2 comprises a first lateral plate 4, as well as a second lateral plate 5 and a third lateral plate 6 that are disposed at two ends of the first lateral plate 4 respectively. The second lateral housing 3 comprises a fourth lateral plate 7, as well as a fifth lateral plate 8 and a sixth lateral plate 9 that are disposed at two ends of the fourth lateral plate 7 respectively.

The first lateral housing 2 and the second lateral housing 3 are fastened to form a closed space that accommodates the stator, the vibrator and the elastic support members 1.

The first lateral housing 2 and the second lateral housing 3 may adopt the structures as shown in FIG. 2 and FIG. 3, namely C-shaped structures as follows.

The first lateral plate 4 and the fourth lateral plate 7 are parallel to each other and are in parallel with the vibrating direction of the vibrator. As shown in FIG. 1, the first lateral plate 4 is an upper plate of the motor housing. The fourth lateral plate 7 is a lower plate of the motor housing. The two side plates are opposite and parallel to each other.

The second lateral plate 5 and the third lateral plate 6 are parallel to each other, and as shown in FIG. 1, are two lateral plates, perpendicular to the vibrating direction of the vibrator, of the motor housing.

The fifth lateral plate 8 and the sixth lateral plate 9 are parallel to each other, and as shown in FIG. 1, are two lateral plates, parallel to the vibrating direction of the vibrator, of the motor housing.

In the present application, as shown in FIG. 2 and FIG. 3, the first lateral plate 4 is docked with and perpendicular to the fifth lateral plate 8 and the sixth lateral plate 9.

The second lateral plate 5 is docked with and perpendicular to the fourth lateral plate 7, the fifth lateral plate 8 and the sixth lateral plate 9.

The third lateral plate 6 is docked with and perpendicular to the fourth lateral plate 7, the fifth lateral plate 8 and the sixth lateral plate 9.

A closed structure of the motor housing is formed through the above-mentioned perpendicular docking and configured to accommodate structures such as the vibrator, the stator and the elastic support members 1.

As shown in FIG. 1 and FIG. 3, a bonding pad is disposed on the second lateral housing, such that a protecting adhesive takes up a smaller space. Accordingly, the space may be effectively saved.

In the present application, as shown in FIG. 1, the stator and the vibrator may be disposed in a conventional manner as follows.

The stator comprises a coil 10 and a circuit board 11 that are mutually connected. The circuit board 11 is secured to the motor housing. The number of the coils 10 may be set in accordance with vibrating requirements of the linear vibrating motor. There are two coils 10 in FIG. 1.

Figure 4:
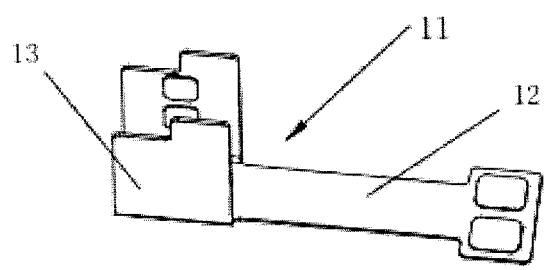
FIG. 4 is a schematic structural view of a circuit board provided by the present application.

As shown in FIG. 4, the circuit board 11 is of a U-shaped structure of which a bottom lateral plate 12 is fixedly connected with the fourth lateral plate 7 and two parallel lateral plates 13 are parallel to the fifth lateral plate 8 and the second lateral plate 5.

The vibrator comprises a mass block 14 and a magnet 15. A mounting hole configured to mount the magnet 15 is provided in the mass block 14. The magnet 15 may be suspended and mounted in the mounting hole through a washer plate 16.

A limiting block 17 is further disposed in the motor housing and limits vibration displacement of the vibrator.

Meanwhile, the elastic support member 1 may be of an elastic sheet or spring structure, for example, a spiral spring or an M-shaped elastic sheet. When the elastic support member 1 is an elastic sheet, a stopper 18 is disposed at a point of connection between the elastic sheet and the motor housing, as well as between the elastic sheet and the mass block 14, such that the connection stability may be enhanced.

In the present application, the linear vibrating motor comprises the motor housing, the stator, the vibrator and the elastic support member 1 through which the vibrator is suspended in the motor housing. The elastic support member is configured to support the vibrator and to provide the elastic restoring force. The motor housing comprises the first lateral housing 2 and the second lateral housing 3. The first lateral housing 2 comprises the first lateral plate 4, as well as the second lateral plate 5 and the third lateral plate 6 that are disposed at two ends of the first lateral plate 4 respectively. The second lateral housing 3 comprises the fourth lateral plate 7, as well as the fifth lateral plate 8 and the sixth lateral plate 9 that are disposed at two ends of the fourth lateral plate 7 respectively. The first lateral housing 2 and the second lateral housing 3 are fastened to form the closed space that accommodates the stator, the vibrator and the elastic support member 1. Thus, vibration feedback of the touch operation by the user may be realized. Disposing of the first lateral housing 2 and the second lateral housing 3 makes the motor housing simple in forming process, relatively lower in processing difficulty and effectively reduced in cost.

The above descriptions are only preferred embodiments of the present application and are not intended to limit the present application. Any modification, equivalent replacement and improvement made within the spirit and principle of the present application should be included in the protection scope of the present application.

What is claimed is:

1. A linear vibrating motor, comprising a motor housing, a stator, a vibrator and an elastic support member for suspending the vibrator in the motor housing, and the elastic support member is configured to support the vibrator and to provide an elastic restoring force, the motor housing comprises a first lateral housing and a second lateral housing, the first lateral housing comprises a first lateral plate, as well as a second lateral plate and a third lateral plate that are disposed at two ends of the first lateral plate respectively, and the second lateral housing comprises a fourth lateral plate, as well as a fifth lateral plate and a sixth lateral plate that are disposed at two ends of the fourth lateral plate respectively; and the first lateral housing and the second lateral housing are fastened to form a closed space that accommodates the stator, the vibrator and the elastic support member, wherein the stator comprises a circuit board, wherein the circuit board is of a U-shaped structure of which a bottom lateral plate is fixedly connected to the fourth lateral plate, wherein two parallel lateral plates of the U-shaped structure are in parallel with the fifth lateral plate and the sixth lateral plate, and wherein the two parallel lateral plates of the U-shaped structure are perpendicular to the bottom lateral plate and the fourth lateral plate.

2. The linear vibrating motor according to claim 1, wherein the first lateral plate and the fourth lateral plate are parallel to each other and are in parallel with a vibrating direction of the vibrator.

3. The linear vibrating motor according to claim 2, wherein the second lateral plate and the third lateral plate are parallel to each other; and the fifth lateral plate and the sixth lateral plate are parallel to each other.

4. The linear vibrating motor according to claim 3, wherein the first lateral plate is docked with and perpendicular to the fifth lateral plate and the sixth lateral plate;

the second lateral plate is docked with and perpendicular to the fourth lateral plate, the fifth lateral plate and the sixth lateral plate; and the third lateral plate is docked with and perpendicular to the fourth lateral plate, the fifth lateral plate and the sixth lateral plate.

5. The linear vibrating motor according to claim 1, wherein the stator further comprises a coil connected to the circuit board, and wherein the circuit board is secured to the motor housing.

6. The linear vibrating motor according to claim 1, wherein two elastic support members are located at two ends of the vibrator along the vibration direction of the vibrator respectively.

7. The linear vibrating motor according to claim 1, wherein the vibrator comprises a mass block and a magnet, and a mounting hole configured to mount the magnet is provided in the mass block.

8. The linear vibrating motor according to claim 1, wherein a limiting block is further disposed in the motor housing.

* * * * *